United States Patent [19]

Dunichev et al.

[11] 4,134,958
[45] Jan. 16, 1979

[54] METHOD OF MANUFACTURING CORRUGATED TUBING OF POLYTETRAFLUORETHYLENE

[76] Inventors: Jury F. Dunichev, ulitsa Zamshina, 50, kv. 12; Anatoly S. Dushenkov, ulitsa Telmana, 52, kv. 191; Arkady K. Pugachev, Oktyabrskaya naberezhnaya, 100, korpus 4, kv. 85, all of Leningrad, U.S.S.R.

[21] Appl. No.: 839,556

[22] Filed: Oct. 5, 1977

[51] Int. Cl.² .......................... B29C 17/00; B29F 5/00
[52] U.S. Cl. .................................. 264/320; 264/286; 264/331; 264/345
[58] Field of Search ............... 264/286, 320, 127, 234, 264/345

[56] References Cited

U.S. PATENT DOCUMENTS

| | | | |
|---|---|---|---|
| 2,430,081 | 11/1947 | Roberts et al. | 264/286 |
| 3,327,039 | 6/1967 | Ruckert et al. | 264/286 |

*Primary Examiner*—W.E. Hoag
*Attorney, Agent, or Firm*—Lackenbach, Lilling & Siegel

[57] ABSTRACT

The method disclosed consists of applying a plain tubular blank in polytetrafluorethylene to a cylindrical mandrel of a diameter providing for a clearance between said blank and mandrel corresponding to the depth of the corrugations to be formed. The blank is retained at its ends concentrically with the mandrel. A wire is then wound in a helical path around the blank under a tension ensuring the forming of helical corrugations, the blank being additionally retained at its outside surface within a zone preceding the zone wherein the corrugations are being formed. On forming the corrugations all the way along the surface of the blank, the product is heat treated at a temperature between 250 and 300° C.

By virtue of the method disclosed, the helix of wire can now be applied to a blank of polytetrafluorethylene at a rate of rotation of the blank which is 5 to 10 times that used ever before and the time of fabricating a corrugated tube between 1 and 3 m long is now reduced by 50 to 33% as compared with the known methods. Moreover, it is now a practical possibility to cut by as much as between 67 and 80% the waste of tubing unsuitable for the purpose for which it was intended.

3 Claims, 1 Drawing Figure

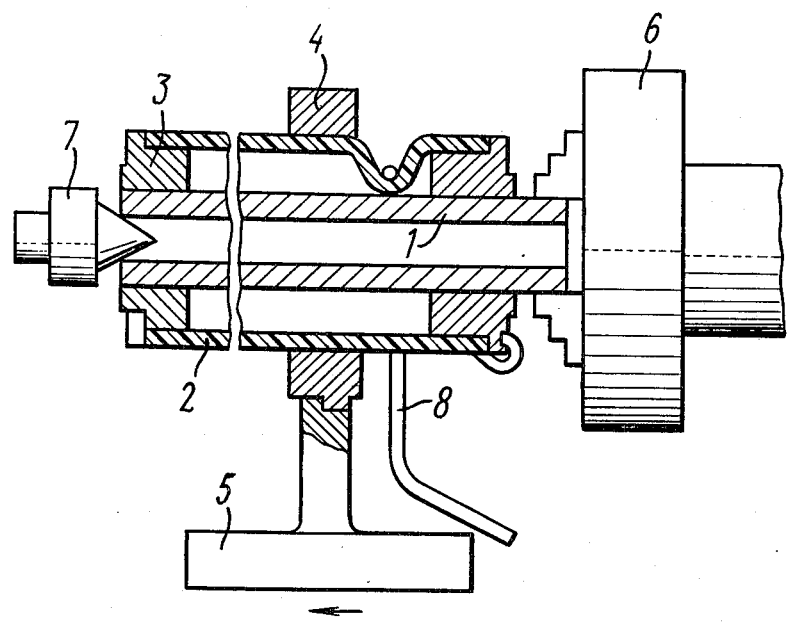

METHOD OF MANUFACTURING CORRUGATED TUBING OF POLYTETRAFLUORETHYLENE

FIELD OF THE INVENTION

The present invention relates to methods of manufacturing pliable and air-tight corrugated tubing of polytetrafluorethylene.

Since polytetrafluorethylene displays an outstanding chemical inertness and a low second order transition temperature, pliable corrugated tubing made from this material enjoy widespread application in the chemical industry and cryogenic technology as a means of handling such fluids as concentrated nitric acid, mixture of fluorhydric and sulfuric acids, high-purity reagents, liquid nitrogen and oxygen. Corrugations enable tubing of polytetrafluorethylene to bend at a radius equal to between 3 and 5 times its diameter, i.e., so sharply that plain tubing commonly breaks under such circumstances, thereby blocking a flow of the fluid handled. It is well known that polytetrafluorethylene (PTFE) does not pass into the state of viscous flow upon heating and that its crystalline phase is transformed into a highly-elastic gel on being melted. This is the reason why none of the existing methods of forming such a product as corrugated tubing from viscous plastic melt is suitable for this material and why corrugated tubing of PTFE is commonly made from plain tubular blanks.

DESCRIPTION OF THE PRIOR ART

There is known a method of manufacturing corrugated tubing from plan tubular blanks of polytetrafluorethylene wherein a length of PTFE tube is placed in the cavity of a metal die, air-tightly plugged at both ends and, the die is heated integrally with the tube to a temperature between 280 and 315° C. After that, compressed air is admitted inside the tube, causing corrugations to form. The process is finished by rapid cooling of the die, relieving it of the pressure applied, taking apart the die and withdrawing the corrugated tube in PTFE. Said method is disadvantageous in that its realization is associated with the use of intricate metal dies of the split type which are difficult to make when the manufacture of long tubing, exceeding, for example, 1 m in length, is involved. Another disadvantage is that much time is being wasted in heating the die and the tube contained therein with the result that the rate of producing corrugated tubing is low.

Also known is a method of manufacturing corrugated tubing of polytetrafluorethylene according to which tubing with corrugations following a helix is produced by forming a succession of corrugations within a length of a plain tube. To that end, the plane tube is compressed from the outside and corrugations are formed from the inside, using a mandrel of a shape corresponding to the shape of the corrugations. This operation is repeated from one length of the tube to another, and the method described in the FRG Pat. No. 1,753,448 is characterized by the long duration of the process, particularly when long tubing is being produced. In realizing this method, use is made of metal mandrels repeating the intricate shape of the corrugated tubing produced. Removal of a finished tube from such a mandrel, especially if the tube is of significant length, is a formidable task.

Further known is a method of manufacturing corrugated tubing of polytetrafluorethylene which is carried into practice by slipping a plain tubular blank on a metal mandrel in a gradual way, winding a wire in a helical path around the blank under tension so as to form helical corrugations and by heat-treating the corrugations, the outside helix being arranged between the turns of a supporting inside helix wound on the mandrel before slipping the tubular blank thereon. Said method allows the production of corrugated tubing of considerable length at an acceptable rate, yet inherent therein are certain disadvantages. The the operation of applying the outside helix between the turns of the supporting inside one cannot be monitored visually when the thickness of the wall of the tube is 1.0 mm, polytetrafluorethylene lacking transparency in this case. Besides impairing the rate of output, this may lead to forming corrugations of a shape distorted to a point which calls for scrapping the product. Another point is that corrugations with a depth of 3 mm and upwards are formed by winding the inside helix from a wire of a diameter which is equal, or close, to the depth of corrugations. It goes without saying that a helix wound from such heavy-gauge wire is a very rigid one and its removal from the finished product is a difficult task.

SUMMARY OF THE INVENTION

It is an object of the present invention to eliminate said disadvantages.

Another object of the present invention is to provide a method of manufacturing corrugated tubing from plain tubular blanks which allows an increase of the rate of output of the process.

A further object of this invention is to provide a method for producing quality corrugated tubing.

The main object of the present invention is to provide a method of manufacturing corrugated tubing wherein use is made of a cylindrical mandrel simplifying the technique of forming corrugations on the tubular blank and making for an increase in the rate of turning out quality products.

These objects are attained when manufacturing corrugated tubing from polytetrafluorethylene, by slipping a plane tubular blank of polytetrafluorethylene on a mandrel, winding a wire in a helical path around the applied blank under a tension so as to form helical corrugations and by heat-treating the corrugations. The tubular blank is slipped, according to the invention, on a cylindrical mandrel of a diameter which ensures that a clearance equal to the depth of the corrugations formed is provided between the tubular blank and the mandrel. Then the blank is retained at its ends concentrically with the mandrel and, in winding the wire in the helical path around the tubular blank, said blank is additionally retained at its outside surface concentrically with the mandrel before the zone of said blank wherein the corrugations are formed with provision for displacing an outside retainer. This additional retention of the blank is effected by said retainer traveling over the surface of the blank at a rate equal to the rate at which the wire is wound on the blank and corrugations are formed in the blank.

The method disclosed offers the possibility of manufacturing corrugated tubing in substantial lengths from tubular blanks of polytetrafluorethylene by simple operations which can be easily monitored so as to prevent any defects in the tubing manufactured. In realizing the method disclosed it is possible, for example, to apply the wire helix to a plain tube of polytetrafluorethylene at a rate which is 5 to 10 times that of applying the wire in accordance with the known method. Also the time of fabricating a corrugated tube between 1 and 3 m long can now be reduced by 33 to 50%, and there is a possibility of cutting some 1%, i.e., by 67 to 80%, the waste of tubing unsuitable to serve the purpose it is intended to.

In accordance with the present invention it is preferred to use blanks of polytetrafluorethylene which have been quenched in melted form and display a density of less than 2.150 g/cm$^3$. The realization of the invention in this embodiment is conductive to better flexibility of the tubing.

To reduce the tension in the wire wound around the blank of polytetrafluorethylene, it is preferred in accordance with the invention to wind the wire around the blank at a temperature between 20 and 80° C.

Other objects and advantages of this invention are apparent from the following detailed description of the method of manufacturing corrugated tubing, examples of the way this invention can be realized and a drawing.

BRIEF DESCRIPTION OF THE DRAWING

FIG. 1 is an elevational view, partly in section, of an apparatus for effecting the method of manufacturing corrugated tubing according to the invention.

DETAILED DESCRIPTION OF THE INVENTION

The present invention has become a practical possibility due to the discovery that corrugated polytetrafluorethylene tubing can be formed by applying a wire in a helical path to a plain blank without a recourse to an internal supporting member — an internal helix or a shaped mandrel. It has been further discovered that a length of the tubular blank with corrugations already formed therein can well serve as one supporting member, and a means of fixing the blank at its outside surface, capable of displacing at a rate corresponding to the rate of corrugation formation, is another reliable supporting member. We have found that, as the wire is being wound, it forms corrugations between the supporting members of a cross section determined by the pitch of the wire helix, by the thickness of the wall of the tubular polytetrafluorethylene blank and by the clearance between the mandrel and the blank in polytetrafluorethylene.

The essence of the method disclosed is as follows. On a metal mandrel 1 with an outside diameter corresponding to the inside diameter of the corrugated length of the tube to be produced there is slipped a plain tubular blank 2 of polytetrafluorethylene so that a clearance corresponding to the depth of the corrugations to be formed is provided between said mandrel 1 and said blank 2. Metal inside retainers 3 serving to fix the blank 2 at its ends concentrically with the mandrel 1 are inserted into the ends of the blank 2 around the mandrel 1. A sleeve functioning as an outside retainer 4 for fixing the blank 2 relative to the mandrel 1 is slipped on the tubular blank 2. The outside retainer 4 is secured in a saddle 5 ensuring for said outside retainer 4 the possibility of displacing over the surface of the blank 2 in the axial direction so as to retain the blank 2 concentrically with the mandrel 1 at the beginning, and in the course, of the process of forming corrugations. The mandrel 1 integrally with the blank 2 and the inside retainers 3 is clamped in a chuck 6 at one end and is held by a center 7 at the other end.

Used as the apparatus imparting rotary motion to the chuck 6 and providing support to the saddle 6 and the center 7 can be a conventional thread-cutting lathe or a special machine for winding the helix of wire at a specified pitch of the helix synchronized with the rate of rotation of the chuck 6.

The winding of a wire 8 in a helical path is started from the inside retainer 3 facing the chuck 6, and the initial position of the outside retainer 4 is at a point separated from this inside retainer 3 by a distance equal to the pitch of the helix wound. The outside retainer 4 is set into motion over the surface of the tubular blank 2 at a rate corresponding to the rate of applying the wire 8 to the blank 2 in the helical path.

On winding the entire length of the wire 8, its end is attached to the second inside retainer 3 facing the center 7 and the entire assembly of the mandrel and the blank with the wire wound around it is removed for heat treatment. On heat treating at a temperature between 250 and 300° C., the assembly is cooled to room temperature and taken apart, the helix wound from the wire 8 being removed first, followed by the inside retainers 3 and the mandrel 1. The product is a pliable corrugated tube with intact ends by means of which the tube can be readily connected to a line or to an apparatus it is intended to serve.

It is known that the heat treatment is required for the relaxation of the stresses set up in polytetrafluorethylene and for the retaining by the product of the shape it has been given. The speed up the stress relaxation, the temperature commonly exceeds 250° C. but should never be as high as 310° C. otherwise rapid crystallization of the polytetrafluorethylene at this temperature will lead to the loss of flexibility by the product.

The metal mandrel 1 used must be of diameter providing for the requisite bore of the corrugated length of the tube after forming, and the length of said mandrel 1 commonly exceeds the initial length of the blank 2 by an amount enabling the mandrel to be held in the chuck 6 and supported by the center 7. The surface of the mandrel 1 must be smooth otherwise the bore of the corrugated length of the tube can be damaged. The most suitable material for the mandrel 1 is stainless steel capable of withstanding temperatures up to 300° C. without corrosion.

The material of the plain tubular blank 2 can be a finely-dispersed polytetrafluorethylene suitable for processing by paste extrusion as Teflon-6 and Teflon-6c marketed in the USA by Du Pont. In Great Britain such materials are known as Fluon CD/CD-4, a product of ICI, and in the USSR it is given the trade name of Ftorlon-4D. Tubing extruded from polytetrafluorethylene of said grades commonly has a wall thickness varying between 0.8 and 2.5 mm and is regarded as the most suitable material for the manufacture of corrugated tubing according to the method disclosed. Yet, if there is a choice, preference should be given to quenched tubing, i.e., one which has been rapidly cooled from a polytetrafluorethylene melt at 350–400° C. to 20–200° C. Said quenching stabilizes the crystallization of polytetrafluorethylene at a low level, thus adding to the pliability of the tubing and facilitating and forming of corrugations in accordance with the invention.

The diameter of the plain blank 2 is selected so that corrugations of a depth sufficient to provide for good pliability of the tube of given bore can be formed. Commonly, sufficiently pliable is tubing with a ratio between the maximum outside and the maximum inside diameter anywhere between 2:1 and 1.3:1, the thicker the tube wall the higher the ratio.

The length of the plain blank depends on the specified length of the corrugated portion of the tube and varies with the available means of applying the helix.

The inside retainers 3 controlling the length of the plain ends of the corrugated tube must tightly fit the mandrel 1 at the perimeter thereof and each must be held fast by a set screw of any kind so as to prevent them from displacing and rotating.

The outside retainer 4 must be capable of moving without hindrance over the surface of the blank 2, it being in close contact with this surface. The length of the outside retainer 4 can vary between 0.5 and 3 diameters of the blank 2, functioning as the outside retainer without distorting the blank 2 is the course of applying the helix. The outside retainer 4 can be either of the solid or of the split type and must be provided with means for attaching to the saddle 5 of the machine for manufacturing corrugated tubing.

The wire 8 used as the material of the helix applied to the plain blank 2 of polytetrafluorethylene must be of mild steel which is not likely to be the cause of overstraining the blank in forming corrugations. The diameter of the wire 8 is decided by the magnitude of the tension applied in forming corrugations which commonly is between 20 and 90 kgf depending on the wall thickness and diameter of the plain blank 2. The preferred diameter of the wire 8 is between 0.5 and 2.5 mm or between 0.8 and 1.6 mm to be more precise. If the wire 8 is of a small diameter, it can cut through the surface of the blank 2. On the other hand, a thick wire causes overstraining of the blank 2 in forming corrugations and a heating of the blank 2 up to 80° C. is required to avoid this.

What needs careful approach is the pitch at which the helix is to be applied in forming corrugations according to the method disclosed, this pitch being decided by such factors as the specified wall thickness, inside diameter and the depth of the corrugations of the tube produced.

The rate of applying the helix is not a crucial factor and depends on the rate of rotation of the chuck 6 which may vary between 10 and 300 I/min. Neither is the temperature at which the corrugations are being formed in the polytetrafluorethylene blank 2, and the process can take place at any temperature varying between room temperature and 80° C., the tube being blown off with a jet of warm air in this latter case. An increase in the temperature of the process allows a reduction of the tension applied to the wire 8 in winding the helix, for polytetrafluorethylene yields to forming more readily at elevated temperatures. Yet, a rise in the temperature above this upper limit is impractical, complicating the task of the operator and extending the duration of the cycle of forming corrugations in the plain blank 2 due to the loss of time in warming up same.

In the method disclosed, corrugations are formed by winding the wire 8 in a helical path over the outside surface of the polytetrafluorethylene blank 2, said blank being retained concentrically relative to the mandrel 1 at all stages of forming corrugations by winding the wire. At the first instant of forming the very first corrugation, the blank 2 is retained at its ends by the inside retainers 3 inserted into the space between the blank 2 and the mandrel 1 as well as by the outside retainer 4 disposed concentrically relative to the blank 2 and the mandrel 1. All the succeeding corrugations are formed while the blank 2 is retained at its outside surface concentrically with the mandrel 1 by the outside retainer 4, which is travelling at the rate at which the wire 8 is being applied in the helical path, and acting as the support which prevents the blank 2 from curving relative to the mandrel 1 are all the previously formed corrugations.

Corrugations of requisite shape are formed by selecting the right relationship between the dimensions of the mandrel 1 and those of the polytetrafluorethylene blank 2 on one hand and by setting the right pitch at which the helix is being wound on the other hand, the clearance between the mandrel 1 and the blank 2 determining the depth of corrugations and the pitch of winding influencing the width of corrugations.

The pitch of winding the helix depends on the initial diameter of the plain blank 2 and commonly is anywhere between 10 and 12.5 mm if the diameter of the blank is 25 to 50 mm. For blanks with the diameter of 12 to 24 mm, the pitch is 6–9 mm. A too small pitch causes a contraction of the outside diameter of the corrugated tube, bringing about the stretching of the polytetrafluorethylene and a tendency of triggering longitudinal microcracks. On the other hand, an excessively wide pitch results in the formation of asymmetrical corrugations which impair the flexibility of the tubing. A technique conducive to enhancing the flexibility of tubing is the compression of the corrugations closer to each other after forming. So, for example, if there is a need to obtain a more flexible tube or to reduce the rigidity of the tubing displayed in bending same, a widely-pitched corrugated tubing can be formed and then the corrugations brought closer to each other by exerting a longitudinal compressive effort by means of the inside retainers 3.

It is thus obvious that the method disclosed is realized without the use of any internal supports in the form of an internal helix, etc., holding fast the blank in a certain position relative to the mandrel 1, and the operations of applying the outside helix and taking apart the package comprising the mandrel with the blank and helix can be done without any difficulty.

EXAMPLE 1

A plain tubular blank 2 of polytetrafluorethylene of what is called dispersed grade with a density of 2.145 g/cm$^3$, an outside diameter of 43 mm, a wall thickness of 1.5 mm and a length of 2000 mm is slipped on a tube of stainless steel, functioning as the mandrel 1, with a diameter of 25 mm and a length of 2200 mm so that a clearance of 7.5 mm is left between the blank 2 and the mandrel 1. Inserted into the ends of the blank 2, so as to embrace the stainless steel tube functioning as the mandrel 1, are metal inside retainers 3 with a length of 50 mm, an outside diameter of 40 mm and an inside diameter of 25.2 mm which retain the blank 2 at its ends relative to the mandrel 1. An outside retainer 4 with an internal diameter of 43.5 mm and a length of 50 mm is applied to the polytetrafluorethylene blank 2 at its outside, and the mandrel 1 is held in the chuck 6 of a thread-cutting lathe at one end and supported by the center 7 at the other end. On securing the outside retainer 4 to the saddle 5 of the lathe by means of an adapter, said retainer was set at a distance of 12 mm from the inside retainer 3 facing the chuck 6 of the lathe. The retainer 3 is held fast to the mandrel 1 by a set screw, and an end of the wire to be wound is attached thereto. The wire, 1.5 mm in diameter, is applied under a tension of 60 kgf by means of guide rollers fitted to a slide of the saddle 5 so that corrugations are formed in the surface of the blank 2 contiguous with the end of the inside retainer 3 and then, between the corrugations already formed and the outside retainer 4. The rate of rotation of the mandrel 1 is 30 rpm, the pitch of winding the helix is 12 mm and the rate of travel of the outside retainer 4 is 360 mm/min, being set by the automatic feed of the saddle 5. The rate of travel of the outside retainer 4 is synchronized with the rate of winding the wire around the blank 2, the winding coming to an end on reaching that part of the blank 2 which is next to the inside spring retainer 3 facing the center 7 of the lathe. After that, the end of the wire is attached to this part of the inside retainer 3 and the mandrel 1 was removed from the lathe integrally with the tube formed. The temperature maintained during the winding is 20° C. On finishing the winding of the mandrel 1 with the blank 2 of the corrugated tube and the metal helix wound around the blank, the ends whereof are secured to the inside retainers 3, and are transferred into an oven where the entire package is heat treated at 280° C. for an hour. On cooling, first to be removed as the helix, followed by the outside retainers 3 and the metal mandrel 1. In the corrugated tube so formed, the length of the flexible part is 1800 mm and plain ends each 50 mm long are provided at either side. The bore of the corrugated length is 25 mm, the depth of the corrugations is 7.5 mm and the pitch of the corrugations is 12 mm. The minimum radius of a bend of this corrugated tube is 60 mm.

EXAMPLE 2

A corrugated tube of polytetrafluorethylene is formed in exactly the same way as described in Example 1 except that the outside retainer 3 facing the center 7 of the lathe is shifted, before taking down the mandrel 1, along the surface of this mandrel so as to bring the corrugations closer to each other in the axial direction. On displacing the retainer by as much as 450 mm, it is secured to the mandrel 1 by a set screw.

The product is a corrugated tube with a flexible portion some 1350 mm long. The depth of the corrugations is 7.6 mm, the pitch of the corrugations is 9.2 mm and the bore of the corrugated portion is 25.2 mm. The minimum radius of a bend of this corrugated tube is only 50 mm.

EXAMPLE 3

A plain tubular blank 2 of quenched polytetrafluorethylene with a density of 2.138 g/cm$^3$ is slipped on a metal mandrel 1 with a diameter of 12 mm and a length of 1300 mm. The length of the polytetrafluorethylene blank 2 is 1100 mm, the outside diameter of the blank is 21.5 mm, the wall thickness is 1.15 mm and the minimum radius of the bend is 220 mm.

Inside retainers 3 each 40 mm long are inserted into the clearance between the mandrel 1 and the blank 2, and an outside retainer 4 with an internal diameter of 22 and 40 mm long is slipped over the blank 2. The package so assembled is fitted to a thread-cutting lathe, the outside retainer 4 is secured to the saddle 5 and set concentrically with the axis of rotation of the lathe chuck 6. A wire 1.2 mm in diameter is wound around the plain blank of polytetrafluorethylene at a tension of 40 kgf, the chuck 6 rotates at a speed of 90 I/min and the pitch of the helix wound is 9 mm which corresponds to a feed of the saddle 5 at a rate of 540 mm/min. On finishing with the winding of the wire, the end thereof is secured to the outside retainer 3, the package is removed from the lathe and transferred into an oven where it is exposed to a heat treatment at 260° C. lasting 1.5 hour. After cooling, the helix, the inside retainers 3 and the mandrel 1 are removed and the product so formed is a corrugated tube with an overall length of 1050 mm, including 970 mm of the corrugated portion. The bore of the the corrugated part is 12.2 mm, the pitch of corrugations was 9 mm and the depth of the corrugations is 4.5 mm. The minimum radius of a bend of this corrugated tube is as small as 32 mm.

EXAMPLE 4

A corrugated tube is formed along the lines given in Example 1 save that the surface of the blank 2 of polytetrafluorethylene is blown off with a jet of air at 80° C. preparatory to applying the wire under a tension of 45 kgf. The corrugated tube so formed displays exactly the same properties as its opposite number described in Example 1.

EXAMPLE 5

A corrugated tube is formed employing the technique described in Example 1 except that the pitch of winding the wire is 15 mm and the rate of feeding the outside retainer 4 corresponding to the rate of winding is 450 mm/min. In the corrugated tube so formed, the flexible portion is 1850 mm long with corrugations 7.5 mm deep and spaced apart by a pitch of 15 mm. Corrugations are of an asymmetrical shape, the minimum radius of the tube bore being 28 mm and the maximum being 45 mm. The minimum radius of a bend of the corrugated portion is 85 mm.

EXAMPLE 6

Formed is a corrugated tube of polytetrafluorethylene, using the technique outlined in Example 3 except that the pitch of winding the wire is 6 mm and the feed of the saddle 5 is at a rate of 270 mm/min. The length of the corrugated tube is 1250 mm, the depth of the corrugations is 3.2 mm and the pitch is 6 mm. The minimum radius of a bend is 110 mm.

EXAMPLE 7

Used for forming a corrugated tube of polytetrafluorethylene is the technique described in Example 1 with the only exception being that the blank 2 is dispersed polytetrafluorethylene with a density of 2.155 g/cm$^3$ extruded from a melt at 380° C. under the conditions of cooling by air. The minimum radius of a bend of the corrugated tube so formed is 100 mm.

What is claimed is:

1. A method of manufacturing corrugated tubing of polytetrafluorethylene consisting of slipping a plain tubular blank of polytetrafluorethylene on a cylindrical mandrel of a diameter ensuring that a clearance equal to the depth of corrugations to be formed is provided between said tubular blank and said mandrel; retaining said blank at its ends concentrically with said mandrel; winding a wire in a helical path around said blank slipped on said mandrel, said wire being applied under a tension causing the formation of said corrugations; before the zone wherein the corrugations are being formed retaining said blank at its outside surface concentrically with said mandrel by a retainer traveling over the surface of said blank at a rate equal to the rate of winding said wire around said blank and of forming and corrugations; and heat-treating the corrugations so formed at a temperature between 250 and 300° C.

2. A method of manufacturing corrugated tubing as claimed in claim 1, wherein use is made of blanks of polytetrafluorethylene which have been quenched in melted form and display a density of less than 2.150 g/cm³.

3. A method of manufacturing corrugated tubing as claimed in claim 1, wherein said wire is wound around said blank at a temperature between 20 and 80° C.

* * * * *